Oct. 30, 1962   E. C. BROWN   3,060,590
METHOD OF TREATING DISCRETE PARTICLES
Filed March 28, 1960   2 Sheets-Sheet 1
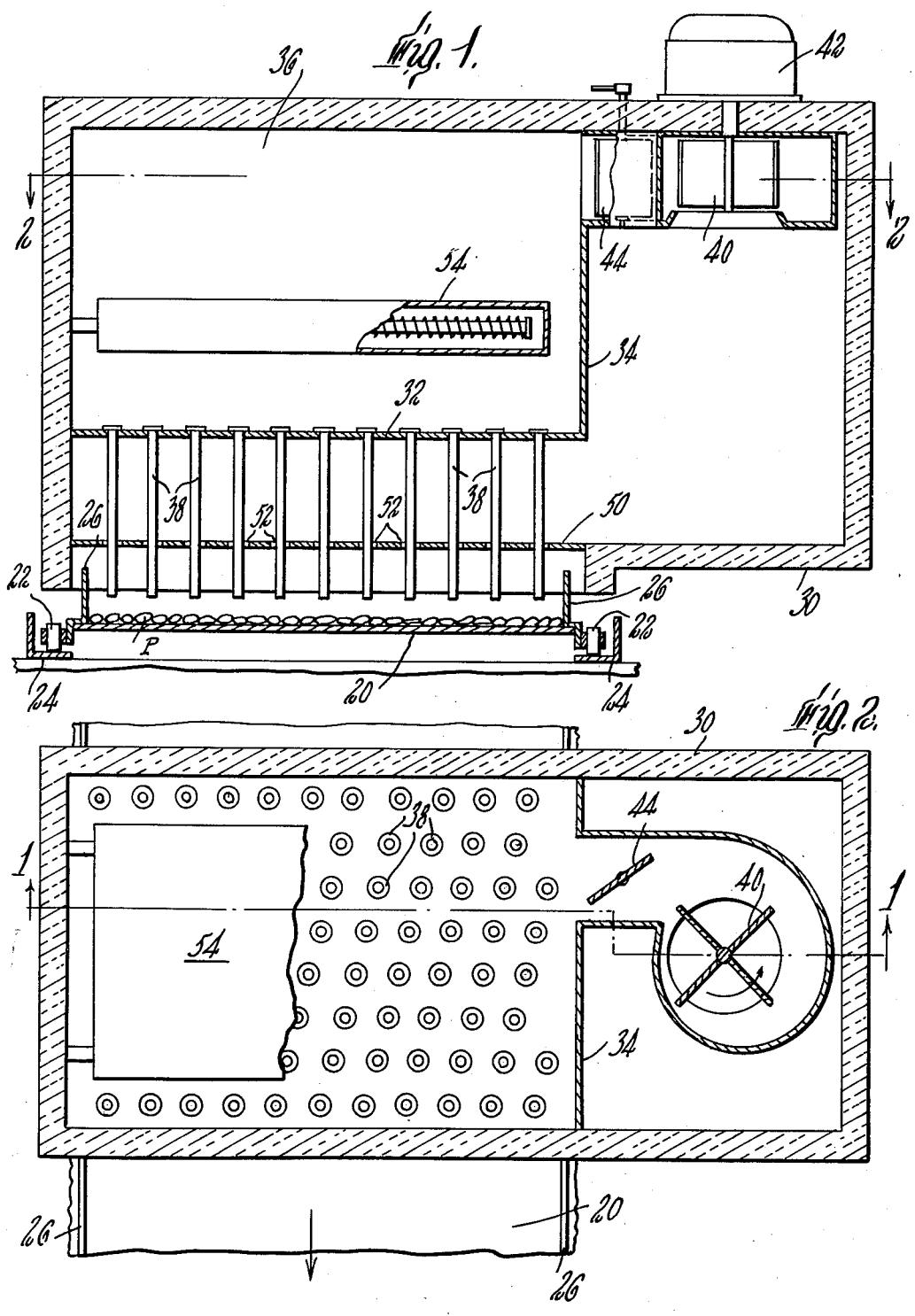

Oct. 30, 1962
E. C. BROWN
3,060,590
METHOD OF TREATING DISCRETE PARTICLES
Filed March 28, 1960
2 Sheets-Sheet 2
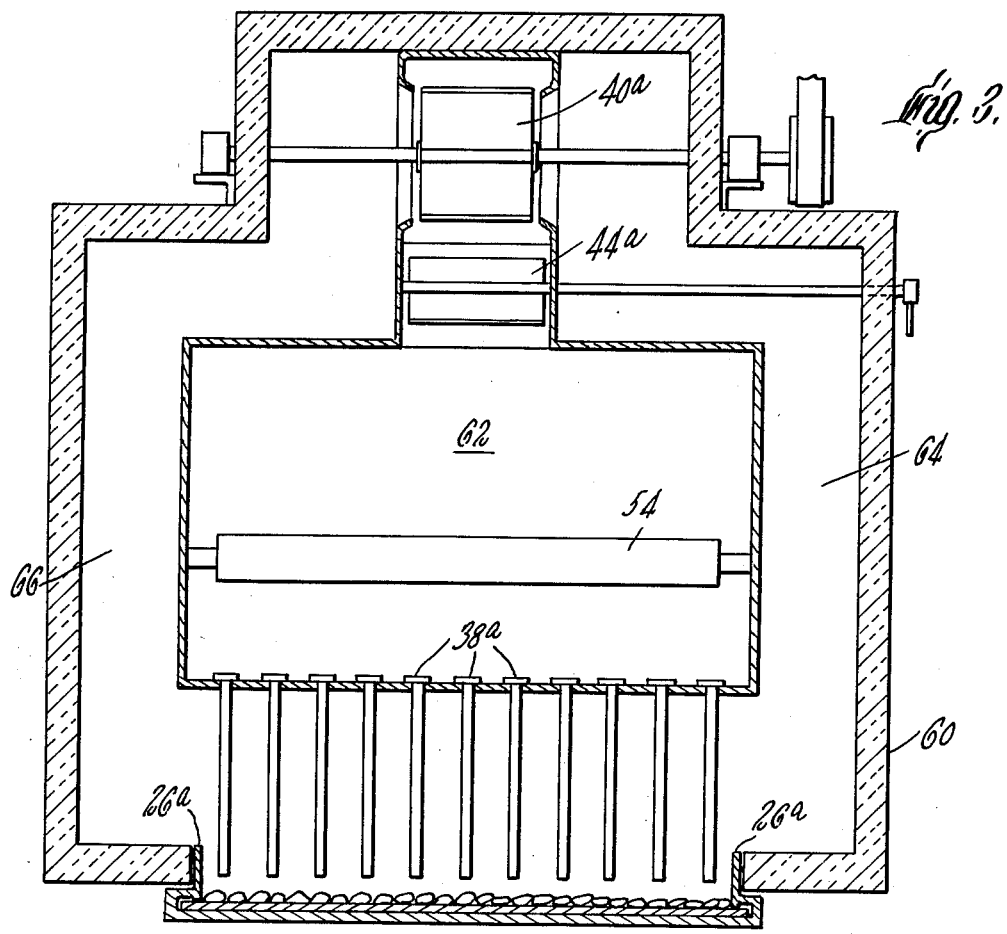
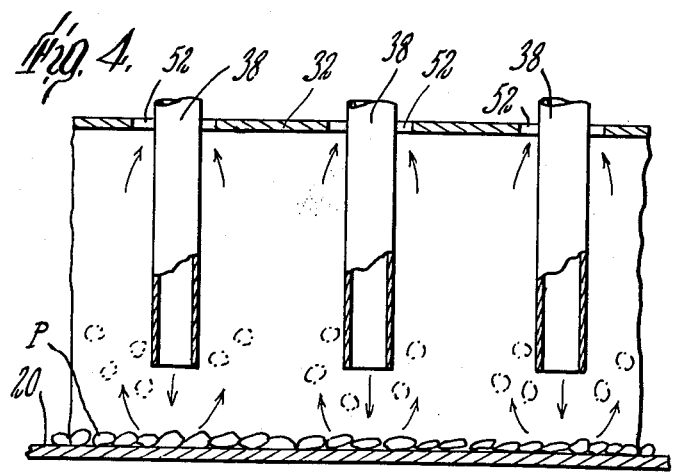

United States Patent Office 3,060,590
Patented Oct. 30, 1962

3,060,590
METHOD OF TREATING DISCRETE PARTICLES
Ernest C. Brown, Danvers, Mass., assignor to Wolverine Equipment Co., Cambridge, Mass., a corporation of Massachusetts
Filed Mar. 28, 1960, Ser. No. 18,099
2 Claims. (Cl. 34—20)

This invention relates to a method of treating particulate matter to cause physical or chemical changes therein of the type resulting from the application thereto or withdrawal therefrom of heat or the application thereto of gaseous reagents.

In the preparation of particulate intermediates such as those of rubber, plastic, resin or other kinds of industrial pellets, food kernels, and the like, drying, curing or cooling operations are often required. Because of the particulate nature of the articles, treatment of the material in dormant bulk form may not be wholly satisfactory because the surfaces of the individual pellets are not exposed sufficiently uniformly to the treatment—certain portions of the pellet surfaces are either in contact with a support or with other surfaces of neighboring pellets and are masked, so to speak, from equal exposure to the treating gas.

Mechanical agitation of such particles has accordingly been resorted to to enhance the likelihood of comparable, or at least desirably adequate, treatment at each point on the surface of the pellets. Stirrers, tumblers and vibrators are common forms of such mechanical agitators, and can be simple in construction and readily provided for batch operations. However, where advance of the bulk through a treating chamber is desired, as on a continuously operated conveyor, the agitating mechanisms become more complicated, particularly where the conveyor is an endless conveyor involving requirements for floating sprocket bearings, thus complicating the necessary driving mechanism in addition to the inherent expense of providing the vibrating mechanism itself.

All efficient present day particulate material dryers known to me make provision for such mechanical agitation even where an endless conveyor is used.

It is an object of this invention therefore to provide in a particulate material treatment apparatus particle agitation without the necessity of agitating the particle support and without otherwise mechanically contacting the bulk.

It is another object of the invention to provide particulate material agitation without overall disturbance of the distribution of the particles on the conveyor.

According to this invention, continuously advancing particulate material is subjected to the action of a plurality of air or other gaseous jets which have sufficient impact velocities to bodily agitate the particular material being treated. This means that in addition to providing the temperature differential required for the treatment in the time selected, the jets will have sufficient velocity to move the particulate materials individually relative to each other and in some instances with sufficient force to turn them over to insure exposure of all surface portions.

The agitation must, however, be in random fashion so fas as direction is concerned. Otherwise disturbance of the bulk will be so great as to vary its general uniformity in thickness or other arrangement on the conveyor to vary the rate of advance of individual particles with consequent loss in uniformity of exposure either temperaturewise, timewise or both.

Accordingly, unless the jet treatment unit has proper provision for exhausting the spent gas, exhaust turbulence can cause unidirectional motion of the particles disrupting the desired distribution of the layer of particles.

Random agitation in accordance with this invention may be secured for example in apparatus as shown in FIGS. 1 and 2, or apparatus as shown in FIG. 3.

FIG. 1 is a cross-sectional view of an apparatus useful in carrying out the method of this invention;

FIG. 2 is a horizontal cross-sectional view taken along the line 2—2 of FIG. 1;

FIG. 3 is a cross-sectional view of a modified form of apparatus useful in carrying out the method of this invention; and FIG. 4 is an enlarged detail of a certain portion of the apparatus shown in FIG. 1.

The apparatus shown in FIG. 1 includes a conveyor supporting surface 20 which may be of any conventional construction but as shown is provided with rollers 22 which engage spaced tracks 24—24 for conveying particulate material P shown positioned on the conveyor.

The conveyor supporting surface is also provided with upstanding edge flanges 26 one on each side to retain the particulate material from falling off the edges of the conveyor.

Superimposed over the conveyor is an air circulating apparatus enclosed within a casing 30. A horizontal partition 32 parallel with the plane of the conveyor supporting surface 20 extends partially across the interior of the casing 30 meeting a vertical partition 34 to define an upper plenum chamber 36.

Piercing the partition 32 at regular spaced intervals are a series of downwardly extending tubes 38 which terminate along a plane spaced slightly above the plane of the conveyor supporting surface 20. Provision is made to vary the height of tubes 38 above conveyor supporting surface 20 by raising or lowering either the entire casing 30 or the conveyor supporting surface 20. These tubes form a series of nozzles through which air can be circulated as by fan 40 driven by motor 42 and may be circulated at velocities which can be partly controlled by the damper 44. The suction side of the fan 40 communicates with an exhaust plenum chamber which is formed below the partition 32 by reason of the interposition of a second lower partition 50 through which the tubes 38 extend via apertures 52.

A heater 54 is positioned in chamber 36, though obviously this could be replaced by a refrigerating condenser if desired.

In one example, then, for heating plastic particles, the fan is designed to create a discharge at the bottom of tubes 38 for example at a velocity of 8,000 feet per minute which will impart an impact to particles which have individual weights in the range of 0.26 gram sufficient to agitate them and move them around slightly on the conveyor in random directions. A shown by the arrows in FIG. 4 the space between the tubes 38 provides a chamber wherein the air flow drops its velocity very rapidly and may come down to a figure around 300 feet per minute. Then as the air discharges upwardly through the apertures 52, the velocity increases to somewhere in the range of 2,800 feet per minute. Since the discharge however of the air issuing from each tube is almost entirely through the orifice 52 which surrounds that tube there is no general lateral flow from a plurality of jets and no longitudinal flow so that there is no tendency to move the particles unidirectionally with a flow of exhaust air.

FIG. 3 shows a modified form of apparatus for carrying out the method of this invention wherein the lower partition 50 has been omitted and the position of the input plenum chamber has been centrally located in a casing 60 so that the plenum chamber 62 is in the middle of the apparatus and the exhaust passages 64 and 66 extend upwardly at the sides of the partitions forming the plenum chamber 62. As shown this requires a different location of the fan 40a and damper 44a. However, it will be noted that the tubes 38a are of such length that a substantial space is contained around the tubes with the result that the exhausting air will have such slow velocity being only a few hundred feet per minute that there will be no tendency for it to disturb the particles advancing on the conveyor supporting surface 20. This is particularly so because the flanges 26a in this case are fixed to the edge of the belt conveyor structure and extend downwardly to prevent the egress of air except through the exhaust passages 64 and 66 which are above the plane of the particles on the conveyor.

While in most cases the layer of particles on the conveyor will be a single layer of particles, in some cases the layer may be thicker for example, 5 or 6 layers, and contain superposed particles, depending upon the density of the particles and the permissible jet velocity.

What is claimed is:

1. In a method of transferring heat to or from discrete particles, the method which comprises advancing the particles continuously along a predetermined plane path of advance in the form of a layer having its top surface unconfined with all the particles on top of the layer free to move upwardly, and, as the particles advance, agitating and moving the particles bodily relative to one another and turning over at least some of said particles by subjecting the layer to the impact of a series of spaced jets of gas, having a temperature different from that of said particles, directed normally downwardly onto the top of said layer at high velocity to move all of the particles beneath each jet with random directional motion and withdrawing the gas issued from each jet, after it has moved the particles, upwardly in a direction away from said layer with a velocity so reduced as to be insufficient to support said particles thereby permitting them to gravitate back into said layer with random distribution.

2. The method as claimed in claim 1, wherein the particles are advanced along said path as a single layer of particles.

References Cited in the file of this patent

UNITED STATES PATENTS

| | | |
|---|---|---|
| 2,042,610 | Littleton | June 2, 1936 |
| 2,401,520 | Spooner | June 4, 1946 |
| 2,645,031 | Edwards | July 14, 1953 |
| 2,682,116 | Dungler | June 29, 1954 |

FOREIGN PATENTS

| | | |
|---|---|---|
| 437,410 | France | Feb. 16, 1912 |
| 122,672 | Australia | Nov. 14, 1946 |
| 297,422 | Switzerland | June 1, 1954 |